US008844392B2

(12) United States Patent
Neelakantan et al.

(10) Patent No.: US 8,844,392 B2
(45) Date of Patent: Sep. 30, 2014

(54) ELECTRO-HYDRAULIC AND ELECTRO-MECHANICAL CONTROL SYSTEM FOR A DUAL CLUTCH TRANSMISSION

(75) Inventors: Vijay A. Neelakantan, Rochester Hills, MI (US); Bret M. Olson, Whitelake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 357 days.

(21) Appl. No.: 12/797,298

(22) Filed: Jun. 9, 2010

(65) Prior Publication Data

US 2011/0303049 A1    Dec. 15, 2011

(51) Int. Cl.
| | | |
|---|---|---|
| F16H 59/00 | (2006.01) |
| F16H 61/00 | (2006.01) |
| F16H 63/00 | (2006.01) |
| F16H 61/688 | (2006.01) |
| F16H 63/18 | (2006.01) |
| F16H 61/32 | (2006.01) |

(52) U.S. Cl.
CPC .............. *F16H 61/688* (2013.01); *F16H 63/18* (2013.01); *F16H 61/0031* (2013.01); *F16H 61/0021* (2013.01); *F16H 61/32* (2013.01)
USPC ............ 74/335; 74/330; 74/337.5; 74/473.36

(58) Field of Classification Search
USPC ................ 74/733.1, 335, 337.5, 473.24, 330, 74/473.31–473.37; 475/204; 192/84.6
See application file for complete search history.

(56) References Cited

U.S. PATENT DOCUMENTS

| | | | | |
|---|---|---|---|---|
| 3,876,028 | A * | 4/1975 | Asano et al. ................... | 180/338 |
| 4,860,607 | A * | 8/1989 | Numazawa et al. ............ | 74/330 |
| 5,024,638 | A * | 6/1991 | Sakakibara et al. .......... | 475/210 |
| 5,052,990 | A * | 10/1991 | Sakakibara et al. .......... | 475/210 |
| 5,224,393 | A * | 7/1993 | Ashikawa et al. ............ | 74/337.5 |
| 6,012,561 | A * | 1/2000 | Reed et al. .................... | 192/48.2 |
| 6,361,287 | B1 | 3/2002 | Hopper | |
| 6,463,821 | B1 * | 10/2002 | Reed et al. ....................... | 74/330 |
| 6,502,657 | B2 * | 1/2003 | Kerrebrock et al. .......... | 180/218 |
| 6,612,959 | B2 * | 9/2003 | Frost ............................. | 475/288 |

(Continued)

FOREIGN PATENT DOCUMENTS

| | | |
|---|---|---|
| DE | 2141564 A1 | 2/1973 |
| DE | 4320353 A1 | 1/1994 |

(Continued)

*Primary Examiner* — Troy Chambers
*Assistant Examiner* — Alexander Vu

(57) ABSTRACT

A control system for controlling a dual clutch transmission having a synchronizer assembly includes a motor for selectively providing an output torque in a first and second to both of a first and a second output member. A one-way device is interconnected to the first output member and is operable to transmit the output torque in the first rotational direction. A pump is connected to the one-way device. A disconnect device is interconnected to the second output member. The torque disconnect device is operable to decouple the motor from a cam or a torque multiplication device. The cam includes at least one groove having a configuration corresponding to synchronizer assembly positions. A shift fork is disposed in the groove and is operable to translate the synchronizer assembly. Rotation of the cam translates the shift fork and the synchronizer assembly between at least a neutral position and an engaged position.

20 Claims, 2 Drawing Sheets

(56) References Cited

U.S. PATENT DOCUMENTS

| | | | |
|---|---|---|---|
| 6,869,382 B2* | 3/2005 | Leising et al. | 477/77 |
| 7,082,850 B2* | 8/2006 | Hughes | 74/329 |
| 7,131,933 B2* | 11/2006 | Tabata | 477/181 |
| 7,644,638 B2* | 1/2010 | Taniai | 74/335 |
| 7,661,331 B2* | 2/2010 | Ogami et al. | 74/337.5 |
| 2003/0119629 A1* | 6/2003 | Kuhstrebe | 477/77 |
| 2005/0288149 A1* | 12/2005 | Kuhstrebe et al. | 477/97 |
| 2008/0234101 A1* | 9/2008 | Suzuki | 477/97 |
| 2010/0018829 A1* | 1/2010 | Neelakantan et al. | 192/12 C |
| 2010/0105522 A1* | 4/2010 | Hagelskamp | 477/138 |
| 2010/0326542 A1* | 12/2010 | Xie et al. | 137/487.5 |
| 2011/0303049 A1* | 12/2011 | Neelakantan et al. | 74/733.1 |

FOREIGN PATENT DOCUMENTS

| | | |
|---|---|---|
| DE | 19813982 A1 | 10/1999 |
| DE | 19857222 A1 | 6/2000 |
| DE | 10147123 A1 | 4/2002 |
| DE | 10160884 A1 | 6/2003 |
| DE | 10327406 A1 | 2/2005 |
| DE | 102004001753 A1 | 8/2005 |
| DE | 102005006431 A1 | 8/2006 |
| EP | 0157086 A1 | 10/1985 |
| EP | 0475488 A1 | 3/1992 |
| EP | 0933564 A2 | 8/1999 |
| EP | 1420185 A1 | 5/2004 |
| WO | WO9705410 A1 | 2/1997 |

* cited by examiner

ELECTRO-HYDRAULIC AND ELECTRO-MECHANICAL CONTROL SYSTEM FOR A DUAL CLUTCH TRANSMISSION

TECHNICAL FIELD

The invention relates to a control system for a dual clutch transmission, and more particularly to an electro-hydraulic and electro-mechanical control system having a cam operable to actuate a plurality of synchronizers within the dual clutch transmission.

BACKGROUND

A typical multi-speed, dual clutch transmission uses a combination of two friction clutches and several dog clutch/synchronizers to achieve "continuous torque or dynamic shifts by alternating between one friction clutch and the other, with the synchronizers being "pre-selected" for the oncoming ratio prior to actually making the dynamic shift. "Continuous torque" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of increased fuel economy and safety, is essentially constant. Accordingly, there is a need for an improved, cost-effective hydraulic control system for use in a dual clutch transmission.

SUMMARY

A control system for controlling a dual clutch transmission is provided. The dual clutch transmission includes at least one synchronizer assembly. The control system includes a prime mover for selectively providing an output torque in a first rotational direction and an output torque in a second rotational direction to both of a first output member and a second output member. A one-way device is interconnected to the first output member and is operable to transmit the output torque in the first rotational direction there through. A pump is connected to the one-way device for receiving the output torque in the first rotational direction. The output torque in the first rotational direction drives the pump to provide pressurized hydraulic fluid to the transmission. A torque transmitting device is interconnected to the second output member. The torque transmitting device is operable to selectively transmit the output torque from the second output member in both the first and second rotational directions. A torque multiplying device such as a gear head is interconnected to the torque transmitting device and receives the output torque in both the first and second rotational directions and is used to multiply torque and reduce speed. A cam is interconnected to the torque multiplying device such as a gear head and receives the output torque in both the first and second rotational directions. The cam includes at least one groove having a configuration corresponding to a plurality of synchronizer assembly positions. At least one shift fork is disposed in the at least one groove and is operable to translate the synchronizer assembly. Rotation of the cam translates the shift fork and the synchronizer assembly between at least a neutral position and an engaged position.

In one example of the present invention the cam is a barrel cam and the groove circumscribes the barrel cam.

In another example of the present invention the control system uses a single prime mover to control both the hydraulically operated clutches and the synchronizers in the dual clutch transmission.

In another example of the present invention the barrel cam rotates about a first axis and the shift fork is translatable along a second axis between the neutral and engaged position, and the first axis is parallel to the second axis.

In another example of the present invention the prime mover, pump, one-way device, and torque transmitting device are coaxial with the first axis.

In another example of the present invention the output torque in the first rotational direction operates the pump to displace and pressurize hydraulic fluid from a sump to a valve body.

In another example of the present invention the one-way device is a one-way clutch.

In another example of the present invention the torque transmitting device is a hydraulically actuated clutch.

In another example of the present invention the torque transmitting device is selectively actuatable by an on/off valve or a solenoid.

In another example of the present invention a sensor is located between the torque transmitting device and the cam, wherein the sensor is operable to sense a rotational position of the cam relative to the shift fork.

In another example of the present invention the torque multiplying device such as a gear head is used to increase the torque and reduce the speed of the prime mover output to the cam.

In another example of the present invention the prime mover is an electric motor.

In another example of the present invention the shift fork includes a fork end in engagement with the synchronizer assembly and a second end disposed within the groove.

In another example of the present invention the second end of the shift fork includes a roller bearing disposed within the groove allowing the shift fork to ride within the groove as the cam rotates.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
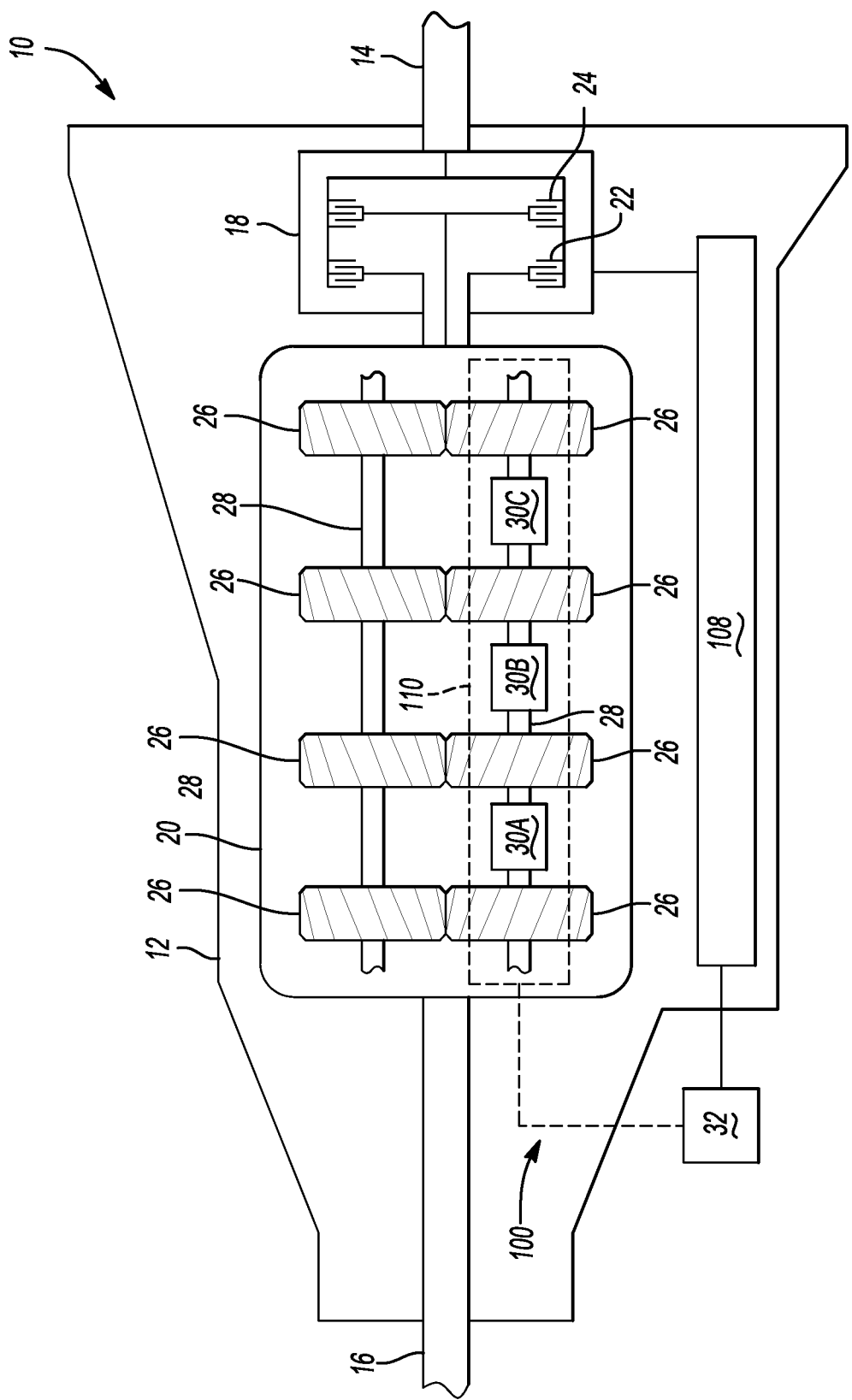
FIG. 1 is a schematic diagram of an exemplary dual clutch automatic transmission incorporating a control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, and a third synchronizer assembly 30C. It should be appreciated that the gear arrangement 20 may include any number of synchronizer assemblies 30 without departing from the scope of the present invention. The synchronizer assemblies 30A-C are operable to selectively couple individual gears within the plurality of gear sets 26 to the plurality of shafts 28. Each synchronizer assembly 30A-C is disposed either adjacent certain single gears or between adjacent pairs of gears within adjacent gear sets 26. Each synchronizer assembly 30A-C, when activated, synchronizes the speed of a gear to that of a shaft using a positive clutch, such as a dog, face, or conical clutch. The clutch positively connects or couples the gear to the shaft. The clutch is bi-directionally translated when the synchronizer assemblies 30A-C are actuated, as will be described in greater detail below.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-C via a control system 100 according to the principles of the present invention. It should be appreciated that the transmission control module can be a stand alone controller or the functionality can be integrated into other vehicle controllers (e.g. PCM).

Figure 2:
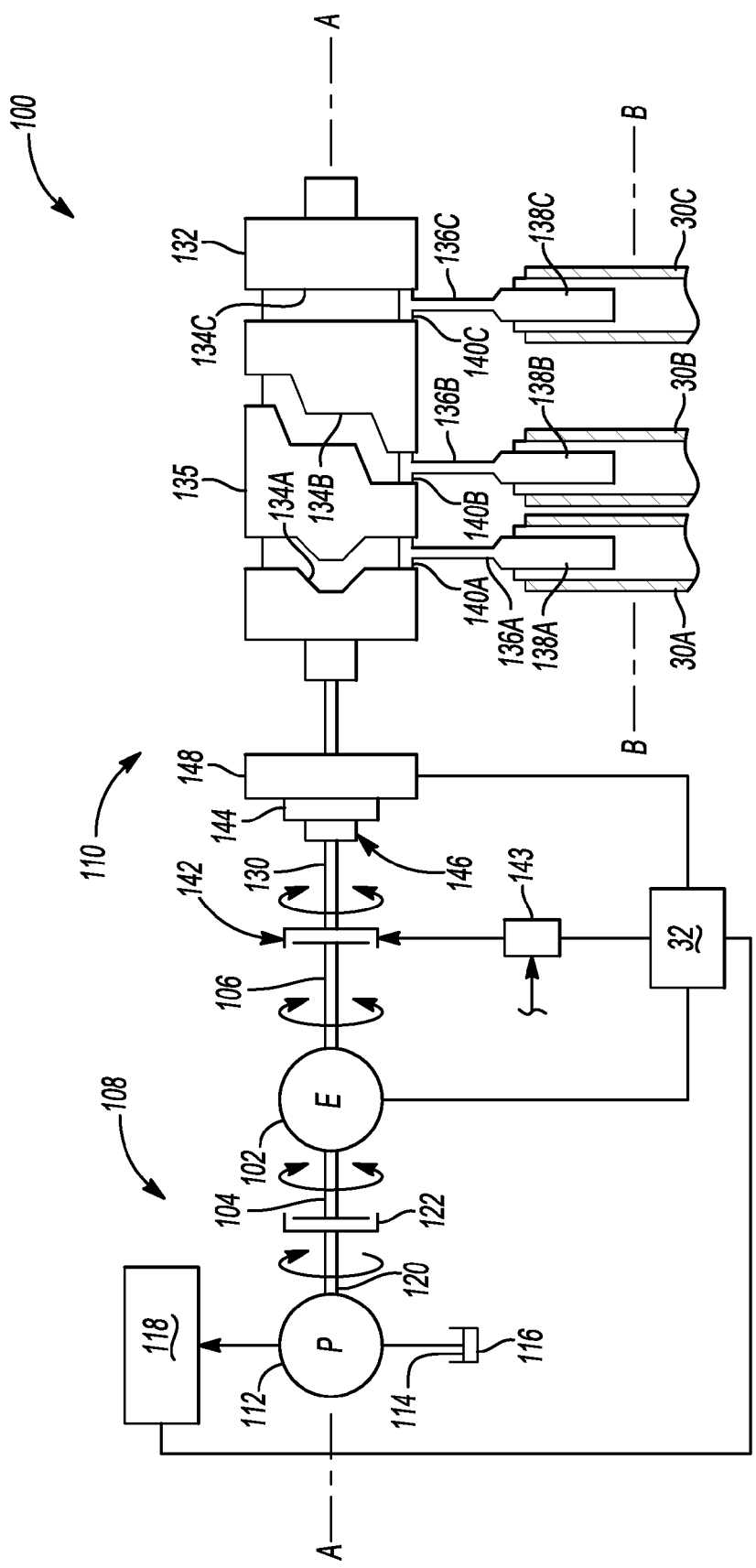
FIG. 2 is a schematic diagram of the control system according to the principles of the present invention.

Turning to FIG. 2 and with continued reference to FIG. 1, the control system 100 of the present invention is operable to selectively engage the dual clutch assembly 18 and the synchronizer assemblies 30A-C by selectively hydraulically actuating the dual clutch assembly 18 and selectively mechanically actuating the synchronizer assemblies 30A-C. The control system 100 is powered by a prime mover or motor 102. The motor 102 is preferably an electric motor, though various other types of prime movers may be employed. The motor 102 provides output torque to a first shaft or member 104 and a second shaft or member 106. It should be appreciated that the shafts 104 and 106 may be separate shafts or a single unitary member without departing from the scope of the present invention. The output torque may be selectively applied to the shafts 104 and 106 in either rotational direction (i.e. clockwise and counterclockwise).

The motor 102 provides output torque to two subsystems within the control system 100: a hydraulic control subsystem 108 for selectively actuating the dual clutch assembly 18 and a mechanical control subsystem 110 for selectively actuating the synchronizer assemblies 30A-C. The hydraulic control subsystem 108 includes a pump 112 that communicates a hydraulic fluid 114 from a sump 116 to a valve body 118. The sump 116 is a tank or reservoir preferably disposed at the bottom of the transmission housing 12 to which the hydraulic fluid 114 returns and collects from various components and regions of the automatic transmission 10. The hydraulic fluid 114 is forced from the sump 116 and communicated to the valve body 118 via the pump 112. The pump 112 is, for example, a gear pump, a vane pump, a gerotor pump, or any other positive displacement pump. The pump 112 is driven by the motor 102. In the example provided, the pump 112 includes a drive shaft or member 120 connected to the first output shaft 104 of the motor 102 through a one-way device 122. The one-way device 122 is driven by the motor 102 and allows the output torque from the motor 102 to communicate in the first rotational direction to the drive shaft 120 while preventing output torque from the motor 102 to communicate in the second rotational direction to the drive shaft 120. The one-way device 122 may be, for example, a one-way clutch such as a sprag clutch or roller clutch and may be selectable. If the pump 112 is operable in both rotational directions in which the input and output of the pump switch functionality, the one-way device 122 may not be employed.

The valve body 118 includes a plurality of fluid passages, valves, and/or solenoids that operate to supply the hydraulic fluid 114 to various components of the transmission 10. For example, the valve body can be used to actuate the dual clutch device 18, and to provide lubrication and cooling to various components within the transmission 10.

The mechanical control subsystem 110 includes a drive shaft 130 connected to a shift barrel cam 132. The shift barrel cam is rotatable about an axis "A" in either rotational direction (i.e. clockwise or counterclockwise) when driven by the drive shaft 130. The shift barrel cam 132 includes a plurality of cam grooves 134A, 134B, and 134C, each corresponding to one of the plurality of synchronizers 30A, 30B, and 30C, respectively. It should be appreciated that any number of cam grooves may be included on the shift barrel cam 132 which correspond to any number of synchronizers without departing from the scope of the present invention. The cam grooves 134A-C are programmed or configured to move engage and disengage the synchronizers 30A-C relative to the rotational position of the shift barrel cam 132. For example, the synchronizers 30A-C are connected to their respective cam groove 134A-C via shift forks 136A, 136B, and 136C, respectively. The shift forks 136A-C each include one forked end 138A-C, respectively, that grips or otherwise engages the synchronizers 30A-C, respectively, and an opposite end having a feature 140A-C which tracks along the groove 134A-C, respectively. The feature 140A-C may be, for example, a pin or a roller bearing or any other feature having a diameter or dimension less than that of the width of the groove 134A-C. The features 140A-C are disposed in the cam grooves 134A-

C, respectively. The features 140A-C allow the shift forks 136A-C to ride within and track with the cam grooves 134A-C as the shift cam barrel 132 rotates.

In the example provided, each synchronizer 30A-C is bi-directionally translatable between a first engaged position, a second engaged position, and a neutral position. The cam grooves 134A-C are configured such that a desired synchronizer 30A-C or combination of synchronizers 30A-C are either in one of the engaged positions or a neutral position, thereby connected desired gear sets within the transmission 10 to rotating shafts to provide desired forward and reverse speed ratios. The cam grooves 134A-C each circumscribe the outer surface 135 of the shift barrel cam 132. FIG. 2 illustrates a simple cam groove 134A-C configuration wherein the second synchronizer 30B is in a first engaged position while the synchronizers 30A and 30C are in a neutral position. As the shift cam barrel 132 rotates, the shift forks 136A-C follow or ride within the cam grooves 134A-C and are selectively translated along a shift axis "B". The axis "B" is parallel to and offset from the axis "A" of the shift barrel cam 132. By configuring the shape of the cam grooves 134A-C relative to one another, complex engagement and disengagement of any number and combination of synchronizers can be achieved based on the rotational position of the shift barrel cam 132 relative to the shift forks of the synchronizers.

The drive shaft 130 is drivingly connected to the second shaft 106 of the motor 102 through a torque transmitting device 142. The torque transmitting device 142 is operable to selectively couple the second shaft 106 to the drive shaft 130 in order to selectively rotate the shift barrel cam 132. In the example provided, the torque transmitting device 142 is a hydraulically actuated clutch actuated by a control device 143. However other methods of actuation can be applied, such as electro mechanical, without departing from the scope of the present invention. The control device 143 may be a solenoid controlled by the controller 32 or an on/off valve disposed within the valve body 118. The control device 143 disconnects the shift barrel cam 132 from the motor 102 when the pump 112 is rotated at an operating speed and is controlled by the controller 32.

A position sensor 144 and a pickup magnet 146 is disposed on the drive shaft 130. The position sensor 144 is operable to determine a rotational position of the shift barrel cam 132 to assist in shift control. Accordingly, the position sensor 144 may take various forms without departing from the scope of the present invention. For example, the position sensor 144 may include a Hall Effect sensor adjacent the torque multiplying device such as a gear head 148. The sensor 144 may also use a magnetized element rotationally fixed to the drive shaft 130. The torque multiplying device 148 is also rotationally fixed relative to the drive shaft 130. The torque multiplying device 148 multiplies torque from the motor 102 to the shift barrel cam 132 while reducing output speed. The sensor 144 communicates the rotational position of the torque multiplying device 148, and therefore the drive shaft 130 and shift barrel cam 132, to the controller 32 to aid in shift control. The sensor 144 and the pickup magnet 146 could be located on either side of the torque multiplying device 148. For a given sensor resolution, it may be advantageous to place the sensor between the torque transmitting device 142 and the torque multiplying device 148.

During operation of the control system 100, the motor 102 is controlled by the controller 32 to operate the pump 112 to operate the hydraulic control subsystem 108 and to rotate the shift barrel cam 132 in two rotational directions to provide shift control to the transmission 10. The one-way clutch 122 prevents the pump 112 from rotating in a direction that would reverse the operation of the pump 112 when the motor 102 operates in such a direction in order to actuate a synchronizer assembly 30A-C via rotation of the shift barrel cam 132. The motor 102, the torque transmitting device 142 and the torque multiplying device 148 are used to control the rotational position of the shift barrel cam 132, thereby controlling the engagement and disengagement of the synchronizers 30A-C. Using a single motor 102 for both hydraulic clutch actuation and barrel cam shift actuation reduces the complexity of the system. In addition, the control system 100 requires only a single sensor for shift control.

The description of the invention is merely exemplary in nature and variations that do not depart from the general essence of the invention are intended to be within the scope of the invention. Such variations are not to be regarded as a departure from the spirit and scope of the invention.

The following is claimed:

1. A control system for controlling a dual clutch transmission, the dual clutch transmission driven by an engine and having at least one synchronizer assembly, the control system comprising:
    a prime mover separate from the engine and directly connected to a first output member and a second output member for selectively providing an output torque in a first rotational direction and an output torque in a second rotational direction to both of the first output member and the second output member;
    a pump interconnected to the first output member for receiving the output torque in the first rotational direction and the second rotational direction, wherein the output torque in at least one of the first rotational direction and the second rotational direction drives the pump to provide pressurized hydraulic fluid to the transmission;
    a torque transmitting device interconnected to the second output member, the torque transmitting device operable to selectively transmit the output torque from the second output member in both the first and second rotational directions;
    a cam interconnected to the torque transmitting device for receiving the output torque in both the first and second rotational directions, wherein the cam includes at least one groove having a configuration corresponding to a plurality of synchronizer assembly positions;
    at least one shift fork disposed in the at least one groove, wherein the shift fork is operable to translate the synchronizer assembly, and
    wherein rotation of the cam translates the shift fork and the synchronizer assembly between at least a neutral position and an engaged position.

2. The control system of claim 1 wherein the cam is a barrel cam and the groove circumscribes the barrel cam.

3. The control system of claim 2 wherein the barrel cam rotates about a first axis and the shift fork is translatable along a second axis between the neutral and engaged position, and wherein the first axis is parallel to the second axis.

4. The control system of claim 1 further comprising a one-way device disposed between the prime mover and the pump, the one-way device operable to transmit the output torque only in the first rotational direction from the prime mover to the pump.

5. The control system of claim 4 wherein the output torque in the first rotational direction operates the pump to displace hydraulic fluid from a sump to a valve body.

6. The control system of claim 5 wherein the one-way device is a one-way clutch.

7. The control system of claim 1 wherein the torque transmitting device is a hydraulically actuated clutch or electromechanically actuated.

8. The control system of claim 1 wherein the torque transmitting device is selectively actuatable by an on/off valve or a solenoid.

9. The control system of claim 1 further comprising a sensor located between the torque transmitting device and a torque multiplying device, wherein the sensor is operable to sense a rotational position of the cam relative to the shift fork.

10. The control system of claim 1 wherein the prime mover is an electric motor.

11. The control system of claim 1 wherein the shift fork includes a fork end in engagement with the synchronizer assembly and a second end disposed within the groove.

12. The control system of claim 11 wherein the second end of the shift fork includes a feature within the groove allowing the shift fork to track and follow within the groove as the cam rotates.

13. The control system of claim 1 further comprising a torque multiplication device disposed between the torque transmitting device and the cam, the torque multiplication device configured to multiply torque and reduce speed of the output from the prime mover to the cam.

14. The control device of claim 13 wherein the torque multiplication device is a gear head.

15. A control system for controlling a dual clutch transmission, the dual clutch transmission driven by an engine and having at least one synchronizer assembly, the control system comprising:
    a prime mover separate from the engine and directly connected to a first output member and a second output member for selectively providing an output torque in a first rotational direction and an output torque in a second rotational direction to both of the first output member and the second output member;
    a one-way clutch interconnected to the first output member, the one-way clutch operable to transmit the output torque only in the first rotational direction there through;
    a pump connected to the one-way clutch for receiving the output torque in the first rotational direction, wherein the output torque in the first rotational direction drives the pump to provide pressurized hydraulic fluid to the dual clutch of the transmission;
    a torque transmitting device interconnected to the second output member, the torque transmitting device operable to selectively transmit the output torque from the second output member in both the first and second rotational directions;
    a torque multiplying device interconnected to the torque transmitting device, the torque multiplying device configured to multiply the torque from the torque transmitting device;
    a barrel cam interconnected to the torque multiplying device for receiving the output torque in both the first and second rotational directions, wherein the barrel cam includes at least one groove circumscribing an outer surface of the barrel cam and having a configuration corresponding to a plurality of synchronizer assembly positions;
    at least one shift fork disposed in the at least one groove, wherein the shift fork is operable to translate the synchronizer assembly, and
    wherein rotation of the cam translates the shift fork and the synchronizer assembly between at least a neutral position and an engaged position.

16. The control system of claim 15 wherein the barrel cam rotates about a first axis and the shift fork is translatable along a second axis between the neutral and engaged position, and wherein the first axis is parallel to the second axis.

17. The control system of claim 15 wherein the torque transmitting device is selectively actuatable by an on/off valve or a solenoid.

18. The control system of claim 15 further comprising a sensor located between the torque transmitting device and the torque multiplying device such, wherein the sensor is operable to sense a rotational position of the cam relative to the shift fork.

19. The control system of claim 15 wherein the shift fork includes a fork end in engagement with the synchronizer assembly and a second end disposed within the groove and wherein the second end of the shift fork includes a feature disposed within the groove allowing the shift fork to track and follow within the groove as the cam rotates.

20. A motor vehicle comprising:
    an engine;
    a transmission comprising:
        a dual clutch assembly interconnected to the engine;
        at least one synchronizer assembly;
        an electric motor directly connected to a first output member and a second output member for selectively providing an output torque in a first rotational direction and an output torque in a second rotational direction to both of the first output member and the second output member;
        a one-way clutch interconnected to the first output member, the one-way clutch configured to transmit the output torque only in the first rotational direction;
        a pump connected to the one-way clutch for receiving the output torque in the first rotational direction, wherein the output torque in the first rotational direction drives the pump to provide pressurized hydraulic fluid;
        a valve body for receiving the pressurized hydraulic fluid from the pump, wherein the valve body is configured to selectively actuate the dual clutch assembly;
        a clutch interconnected to the second output member, the clutch operable to selectively transmit the output torque from the second output member in both the first and second rotational directions;
        a torque multiplying device interconnected to the clutch, the torque multiplying device configured to multiply torque from the clutch;
        a barrel cam interconnected to the clutch for receiving the output torque in both the first and second rotational directions, wherein the barrel cam includes at least one groove circumscribing an outer surface of the barrel cam and having a configuration corresponding to a plurality of synchronizer assembly positions;
        at least one shift fork disposed in the at least one groove, wherein the shift fork is operable to translate the synchronizer assembly between the plurality of synchronizer positions, and
        wherein the prime mover drives the pump to provide the pressurized hydraulic fluid required to actuate the dual clutch assembly and rotates the barrel cam in order to translate the shift fork and the synchronizer assembly to selectively engage a plurality of forward or reverse gear ratios.

* * * * *